(12) United States Patent
Iwase

(10) Patent No.: US 10,084,171 B2
(45) Date of Patent: Sep. 25, 2018

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Kosuke Iwase, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 19 days.

(21) Appl. No.: 14/611,302

(22) Filed: Feb. 2, 2015

(65) Prior Publication Data

US 2015/0255770 A1    Sep. 10, 2015

(30) Foreign Application Priority Data

Mar. 6, 2014    (JP) .................................. 2014-043987

(51) Int. Cl.
| | |
|---|---|
| H01M 2/16 | (2006.01) |
| H01M 10/0525 | (2010.01) |
| H01M 10/0587 | (2010.01) |
| H01M 10/42 | (2006.01) |

(52) U.S. Cl.
CPC ..... H01M 2/1686 (2013.01); H01M 10/0525 (2013.01); H01M 10/0587 (2013.01); H01M 10/4235 (2013.01); H01M 2/1653 (2013.01); Y02T 10/7011 (2013.01)

(58) Field of Classification Search
CPC ........... H01M 2/1686; H01M 10/0525; H01M 10/0587; H01M 2/1653; H01M 10/4235; Y02E 60/122; Y02T 10/7011

USPC .......................................... 429/94, 129, 247
See application file for complete search history.

(56) References Cited

U.S. PATENT DOCUMENTS

| | | | |
|---|---|---|---|
| 6,902,847 | B1 | 6/2005 | Yata et al. |
| 8,431,267 | B2 | 4/2013 | Torata et al. |
| 2009/0148761 | A1* | 6/2009 | Kikuchi ................. B32B 27/32 |
| | | | 429/145 |
| 2013/0337311 | A1 | 12/2013 | Itou |
| 2014/0099530 | A1* | 4/2014 | Yamada ................. B32B 27/32 |
| | | | 429/144 |
| 2015/0171396 | A1 | 6/2015 | Okuno |

FOREIGN PATENT DOCUMENTS

| | | |
|---|---|---|
| CN | 102035043 A | 4/2011 |
| JP | 2000-182600 A | 6/2000 |
| JP | 2009-9947 A | 1/2009 |
| JP | 2010-32346 A | 2/2010 |
| JP | 2011-159506 A | 8/2011 |
| KR | 10-2013-0095788 A | 8/2013 |
| WO | 2013/133025 A1 | 9/2013 |

* cited by examiner

*Primary Examiner* — Jonathan G Jelsma
*Assistant Examiner* — Omar M Kekia
(74) *Attorney, Agent, or Firm* — Sughrue Mion, PLLC

(57) ABSTRACT

A nonaqueous electrolyte secondary battery includes an electrode body that has a positive electrode, a negative electrode, and a separator provided between the positive electrode and the negative electrode. A nonaqueous electrolyte is held at least in the separator. In at least a part of the separator, an amount of change in a thickness of the separator at a time of restraint at 10 MPa is 50% or more.

6 Claims, 6 Drawing Sheets

AXIAL DIRECTION OF ELECTRODE BODY

NONAQUEOUS ELECTROLYTE SECONDARY BATTERY

This nonprovisional application is based on Japanese Patent Application No. 2014-043987 filed on Mar. 6, 2014, with the Japan Patent Office, the entire contents of which are hereby incorporated by reference.

BACKGROUND OF THE INVENTION

Field of the Invention

The present invention relates to a nonaqueous electrolyte secondary battery provided with an electrode body that has a positive electrode, a negative electrode, and a separator provided between the positive electrode and the negative electrode.

Description of the Background Art

Japanese Patent Laying-Open No. 2010-32346 discloses a method of detecting a defect (for example, introduction of a foreign substance into an electrode body, and the like) that may cause occurrence of an internal short circuit.

SUMMARY OF THE INVENTION

According to the method disclosed in Japanese Patent Laying-Open No. 2010-32346, introduction of a foreign substance into an electrode body can merely be detected, but occurrence of an internal short circuit resulting from introduction of such a foreign substance into the electrode body cannot be prevented. According to the present invention, deterioration in the safety of a nonaqueous electrolyte secondary battery resulting from introduction of a foreign substance into an electrode body is prevented.

A nonaqueous electrolyte secondary battery includes an electrode body that has a positive electrode, a negative electrode, and a separator provided between the positive electrode and the negative electrode. A nonaqueous electrolyte is held at least in the separator. In at least a part of the separator, an amount of change in a thickness of the separator at a time of restraint at 10 MPa is 50% or more. The term "restraint at 10 MPa" used herein means compression of the separator by a foreign substance introduced into the electrode body.

Preferably, the amount of change in the thickness of the separator at the time of restraint at 10 MPa is 90% or less.

Preferably, the electrode body is configured by winding the positive electrode and the negative electrode with the separator sandwiched therebetween. The amount of change in the thickness of the separator at the time of restraint at 10 MPa is 50% or more in an outer peripheral portion of the separator. The "outer peripheral portion of the separator" means a portion of the separator that faces the outermost peripheral portion of the positive electrode in the electrode body and is located on the outer peripheral side of the electrode body relative to the outermost peripheral portion of the positive electrode.

Preferably, the separator has a first separator facing the positive electrode, and the amount of change in the thickness of the separator at the time of restraint at 10 MPa is equal to an amount of change in a thickness of the first separator at the time of restraint at 10 MPa. For example, in at least a part of the first separator, the amount of change in the thickness of the first separator at the time of restraint at 10 MPa only has to be 50% or more. Preferably, in the outer peripheral portion of the first separator, the amount of change in the thickness of the first separator at the time of restraint at 10 MPa is 50% or more. The "outer peripheral portion of the first separator" means a portion of the first separator that faces the outermost peripheral portion of the positive electrode in the electrode body and is located on the outer peripheral side of the electrode body relative to the outermost peripheral portion of the positive electrode.

More preferably, the separator has the first separator and a second separator that faces the negative electrode, and an amount of change in a thickness of the second separator at the time of restraint at 10 MPa is 5% or less.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
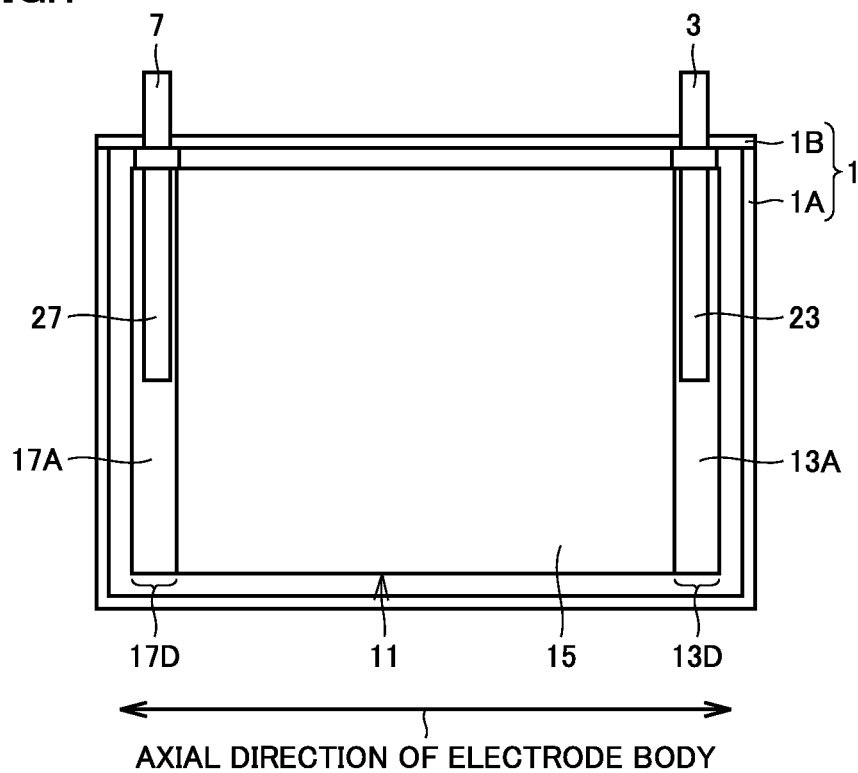
FIG. 1 is a schematic plan view showing an inner structure of a nonaqueous electrolyte secondary battery in one embodiment of the present invention.

The present invention will be hereinafter described with reference to the accompanying drawings. In the accompanying drawings of the present invention, the same or corresponding components are designated by the same reference characters. Furthermore, the dimensional relation of a length, a width, a thickness, a depth, and the like is modified as appropriate for the purpose of clarifying and simplifying each figure, and is not to actual scale.

First Embodiment

Figure 2:
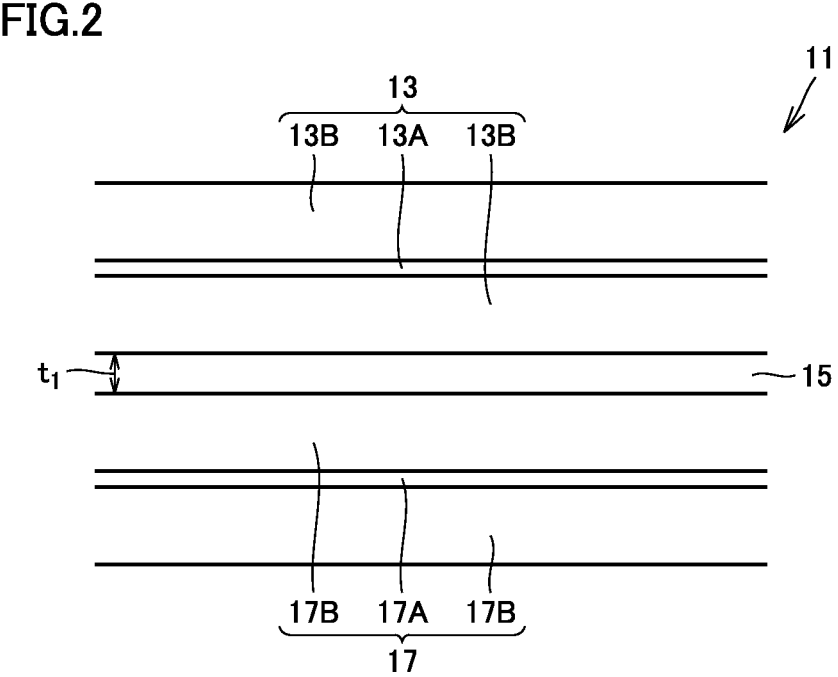
FIG. 2 is a cross-sectional view of a main part of an electrode body in one embodiment of the present invention.

FIG. 1 is a schematic plan view showing an inner structure of a nonaqueous electrolyte secondary battery in the first embodiment of the present invention. FIG. 2 is a cross-sectional view of a main part of an electrode body in the present embodiment. The "axial direction of the electrode body" shown in FIG. 1 means the longitudinal direction of the winding shaft used at the time of production of the electrode body, and is parallel to each of the width direction of a positive electrode, the width direction of a separator, and the width direction of a negative electrode.

The nonaqueous electrolyte secondary battery in the present embodiment is configured in such a manner that an electrode body 11 and a nonaqueous electrolyte are placed in a case main body 1A of a battery case 1. Electrode body 11 is formed by flattening windings of a positive electrode 13 and a negative electrode 17 with a separator 15 sandwiched therebetween. A positive electrode exposing portion 13D of positive electrode 13 and a negative electrode exposing portion 17D of negative electrode 17 protrude from separator 15 in opposite directions in the axial direction of electrode body 11. Positive electrode exposing portion 13D is formed by exposing a positive electrode collector 13A from a positive electrode mixture layer 13B at one end of positive electrode 13 in the width direction. In other words, positive electrode exposing portion 13D is obtained by not providing positive electrode mixture layer 13B on positive electrode collector 13A at one end of positive electrode 13 in the width direction. Such positive electrode exposing portion 13D is connected to a positive electrode terminal 3 provided in a cover body 1B of battery case 1 via a positive electrode lead 23. Negative electrode exposing portion 17D is formed by exposing a negative electrode collector 17A from a negative electrode mixture layer 17B at one end of negative electrode 17 in the width direction. In other words, negative electrode exposing portion 17D is obtained by not providing negative electrode mixture layer 17B on negative electrode collector 17A at one end of negative electrode 17 in the width direction. Such negative electrode exposing portion 17D is connected to a negative electrode terminal 7 provided in cover body 1B via a negative electrode lead 27. A nonaqueous electrolyte is held at least in separator 15.

Figure 3:
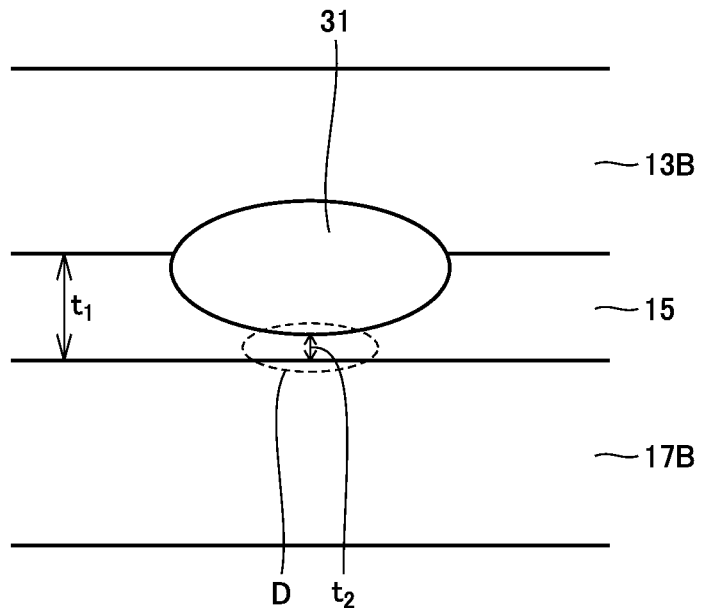
FIG. 3 is a schematic side view of a separator at the time when a foreign substance is introduced into the electrode body.
Figure 4:
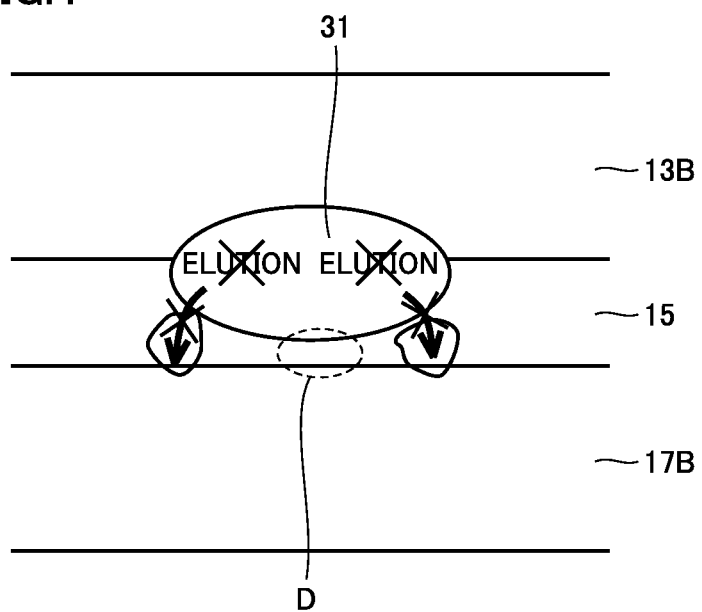
FIG. 4 is a schematic side view of the separator at the time when a foreign substance is introduced into the electrode body.

FIGS. 3 and 4 each are a schematic side view of a separator at the time when a foreign substance is introduced into the electrode body. In separator 15, the amount of change in the thickness of separator 15 at the time of restraint at 10 MPa is 50% or more. The term "restraint at 10 MPa" used herein means compression of separator 15 by a foreign substance 31 introduced into electrode body 11. The "amount of change in the thickness of separator 15" is expressed by the following equation 1. In the following equation 1, a thickness $t_1$ indicates the thickness of separator 15 before restraint at 10 MPa (FIG. 2) while a thickness $t_2$ indicates the thickness of separator 15 at the time of restraint at 10 MPa (FIG. 3). Thickness $t_1$ and thickness $t_2$ can be measured, for example, using a film thickness meter. Though not particularly limited, it is preferable that thickness $t_1$ is 1 µm or more and 15 µm or less.

(Amount of change in thickness of separator 15) (%)=(thickness $t_1$−thickness $t_2$)÷thickness $t_1$×100   Equation 1.

When foreign substance 31 is introduced into electrode body 11, separator 15 receives contact pressure from foreign substance 31 and is compressed (a region D shown in FIG. 3). In the present embodiment, the amount of change in the thickness of separator 15 at the time of restraint at 10 MPa is 50% or more. Accordingly, the thickness of separator 15 becomes equal to or less than half of its original thickness (region D shown in FIG. 3), thereby leading to collapse of pores in separator 15, with the result that the nonaqueous electrolyte held in the pores is pushed out from separator 15. In this way, since a nonaqueous electrolyte is less likely to exist around foreign substance 31, foreign substance 31 can be prevented from being electrochemically dissolved by the electric potential of positive electrode 13 and being eluted in the nonaqueous electrolyte (FIG. 4).

Since elution of foreign substance 31 can be prevented, the eluted substance of foreign substance 31 can be prevented from precipitating on negative electrode 17. Thereby, it becomes possible to prevent an internal short circuit (a chemical minute short circuit) from occurring due to penetration of this precipitate into separator 15. Therefore, even if foreign substance 31 is introduced into electrode body 11, the safety of the nonaqueous electrolyte secondary battery can be highly maintained.

When foreign substance 31 is introduced into electrode body 11, a physical short circuit (a short circuit caused by breakage of separator 15 by foreign substance 31) may occur. In the nonaqueous electrolyte secondary battery, however, a chemical minute short circuit is more likely to occur than a physical short circuit. In the present embodiment, since occurrence of a chemical minute short circuit can be prevented, it becomes possible to effectively prevent occurrence of an internal short circuit caused by introduction of foreign substance 31 into electrode body 11.

Furthermore, introduction of foreign substance 31 into electrode body 11 is more likely to occur during production of a nonaqueous electrolyte secondary battery. In the present embodiment, since occurrence of an internal short circuit resulting from introduction of foreign substance 31 into electrode body 11 can be prevented, it becomes also possible to achieve an effect that the production yield of the nonaqueous electrolyte secondary battery is increased.

It is generally considered that when an internal short circuit occurs in a large-sized battery, a relatively large short-circuit current flows therethrough, thereby significantly deteriorating the safety. According to the nonaqueous electrolyte secondary battery in the present embodiment, however, the safety can be highly maintained even when foreign substance 31 is introduced into electrode body 11. Therefore, the nonaqueous electrolyte secondary battery of the present embodiment is suitable as a large-sized battery used for a power supply for an automobile such as a hybrid vehicle or an electric vehicle, a factory power supply, a household power supply, or the like. Furthermore, separator 15 is suitable as a separator for a large-sized battery.

The amount of change in the thickness of separator 15 at the time of restraint at 10 MPa is preferably 50% or more and 90% or less, and more preferably 50% or more and 85% or less. If this amount of change is 90% or less, deterioration in the electrolyte retention capability of separator 15 can be prevented, so that it becomes possible to prevent deterioration in performance of the nonaqueous electrolyte secondary battery (for example, an increase in I-V resistance, and the like). If the above-described amount of change is 85% or less, deterioration in the electrolyte retention capability of separator 15 can be further prevented, so that it becomes possible to further prevent deterioration in performance of the nonaqueous electrolyte secondary battery.

The method of setting the amount of change in the thickness of separator 15 at the time of restraint at 10 MPa to be 50% or more is not particularly limited. For example, the porosity of separator 15 may be optimized; separator 15 may be formed by a biaxial stretching method; or separator 15 may be made of polyethylene (which will be hereinafter abbreviated as "PE"). Any two or more of these methods may be combined. The "porosity of separator 15" means the proportion of the volume (total) of pores to the volume of separator 15 assuming that pores are not formed. This "porosity of separator 15" is calculated using the density of the material (resin) of separator 15 and the density of separator 15.

When the porosity of separator 15 is set to be 40% or more, the amount of change in the thickness of separator 15 at the time of restraint at 10 MPa can be set to be 50% or more. It is preferable that the porosity of separator 15 is set to be 50% or more. If the porosity of separator 15 is 80% or less, deterioration in the mechanical strength of separator 15 can be prevented. If at least one of the size of each pore in separator 15 and the number of pores in separator 15 is changed, the porosity of separator 15 can be changed.

In addition, the following is the reason why the pressure at the time of restraint is set at 10 MPa in consideration of compression of separator 15 by foreign substance 31. It is considered that, when a foreign substance made of copper (having a diameter of 50 μm or more) is introduced into an electrode body, elution of this foreign substance tends to readily occur, so that a chemical minute short circuit tends to readily occur. In this case, it turned out that a contact pressure of 10 MPa is applied to separator 15 when the nonaqueous electrolyte secondary battery is restrained in the state where a foreign substance (having a diameter of 50 μm) made of copper is provided between positive electrode 13 and separator 15. When the foreign substance is increased in size, the contact pressure to be applied to separator 15 is increased accordingly. From the reasons described above, the pressure at the time of restraint is set at 10 MPa.

Furthermore, as presented in the second embodiment which will be described later, the amount of change in the thickness of separator 15 at the time of restraint at 10 MPa may be 50% or more only in a portion of separator 15.

Second Embodiment

Figure 5:
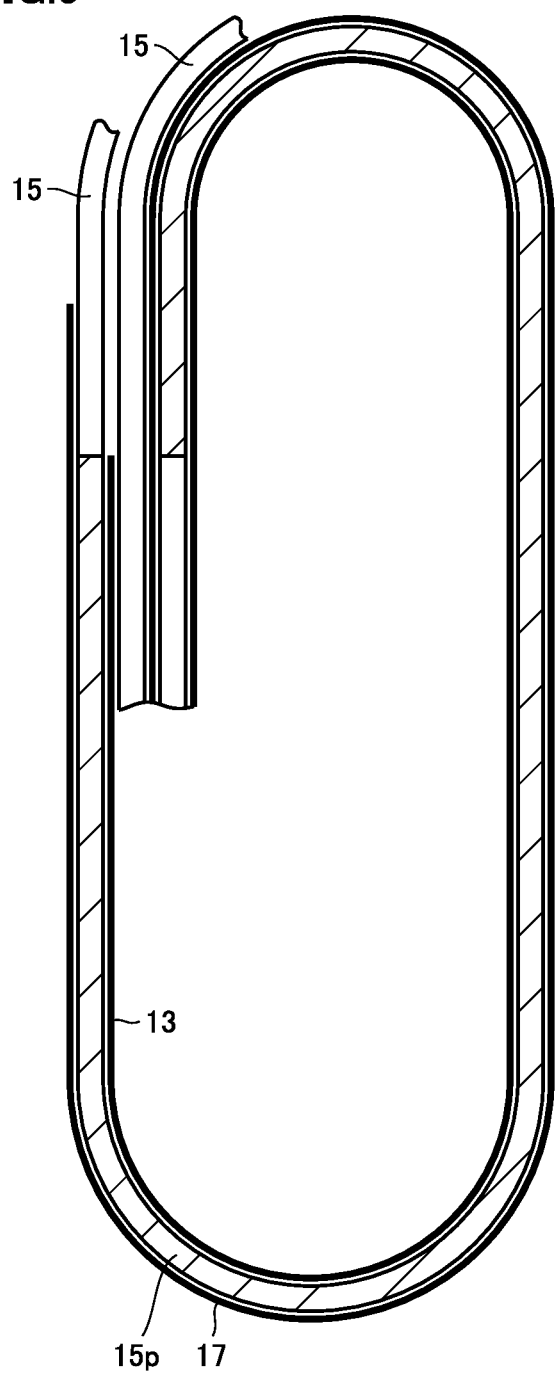
FIG. 5 is a cross-sectional view of a main part of the electrode body in one embodiment of the present invention.

FIG. 5 is a cross-sectional view of a main part of an electrode body in the second embodiment of the present invention. In order to illustrate the feature of separator 15 in the present embodiment, FIG. 5 shows separator 15 so as to be greater in thickness than positive electrode 13 and negative electrode 17. In the following, the features different from those in the above first embodiment will be mainly described.

In the present embodiment, the amount of change in the thickness of an outer peripheral portion 15$p$ (a diagonally shaded region in FIG. 5) of separator 15 at the time of restraint at 10 MPa is 50% or more, whereas the amount of change in the thickness of a residual portion of separator 15 (a portion of separator 15 excluding outer peripheral portion 15$p$ of separator 15) at the time of restraint at 10 MPa is less than 50%. Introduction of foreign substance 31 is more likely to occur on the outer peripheral side of electrode body 11 than on the inner peripheral side of electrode body 11. In the present embodiment, since the amount of change in the thickness of outer peripheral portion 15$p$ of separator 15 at the time of restraint at 10 MPa is 50% or more, occurrence of an internal short circuit resulting from introduction of a foreign substance can be effectively prevented. Therefore, the effect described in the above first embodiment can be achieved.

Furthermore, since the amount of change in the thickness of the residual portion of separator 15 at the time of restraint at 10 MPa can be set to be less than 50%, deterioration in the electrolyte retention capability of the entire separator 15 can be prevented. Therefore, deterioration in performance of the nonaqueous electrolyte secondary battery can be further prevented, and for example, the I-V resistance of the nonaqueous electrolyte secondary battery can be kept low.

More preferably, the amount of change in the thickness of the residual portion of separator 15 at the time of restraint at 10 MPa is 5% or less. Thereby, since deterioration in the electrolyte retention capability of the entire separator 15 can be further prevented, deterioration in performance of the nonaqueous electrolyte secondary battery can be further prevented. For example, the I-V resistance of the nonaqueous electrolyte secondary battery can be kept lower.

The "amount of change in the thickness of the residual portion of separator 15" is expressed by the following equation 2.

(Amount of change in thickness of residual portion of separator 15)(%)=(thickness of residual portion of separator 15 before restraint at 10 MPa−thickness of residual portion of separator 15 at time of restraint at 10 MPa)÷(thickness of residual portion of separator 15 before restraint at 10 MPa)×100         Equation 2.

The method of forming outer peripheral portion 15$p$ of separator 15 is not particularly limited. For example, the method of setting the amount of change in the thickness of separator 15 at the time of restraint at 10 MPa to be 50% or more (described in the above first embodiment) can be used.

The method of forming the residual portion of separator 15 is not particularly limited. The porosity of the residual portion of separator 15 may be optimized; the residual portion of separator 15 may be formed by the uniaxial stretching method; or the residual portion of separator 15 may be made of polypropylene (which will be hereinafter abbreviated as "PP").

If the porosity of the residual portion of separator 15 is set to be less than 40%, the amount of change in the thickness of the residual portion of separator 15 at the time of restraint at 10 MPa can be set to be less than 50%. It is preferable that the porosity of the residual portion of separator 15 is set to be 35% or less.

If the porosity of the residual portion of separator 15 is set to be 20% or less, the amount of change in the thickness of the residual portion of separator 15 at the time of restraint at 10 MPa can be set to be 5% or less. It is preferable that the porosity of the residual portion of separator 15 is set to be 15% or less. In addition, if the porosity of separator 15 is set to be 5% or more, the electrolyte retention capability of separator 15 can be highly maintained.

The method of forming separator 15 is not particularly limited. For example, separator 15 may be formed by joining a resin film having a porosity of less than 40% and a resin film having a porosity of 40% or more. It is more preferable that a resin film having a porosity of 35% or less and a resin film having a porosity of 40% or more are joined to each other, and further preferable that a resin film having a porosity of 20% or less and a resin film having a porosity of 40% or more are joined to each other, and further more preferable that a resin film having a porosity of 15% or less and a resin film having a porosity of 40% or more are joined to each other.

Furthermore, a portion having a porosity of less than 40% and a portion having a porosity of 40% or more may be formed in a resin film in which pores are not formed. It is more preferable that a portion having a porosity of 35% or less and a portion having a porosity of 40% or more are formed in this resin film, and further more preferable that a portion having a porosity of 20% or less and a portion having a porosity of 40% or more are formed in this resin film, and still further preferable that a portion having a porosity of 15% or less and a portion having a porosity of 40% or more are formed in this resin film.

Furthermore, separator 15 may be formed by joining a resin film formed by the uniaxial stretching method and a resin film formed by the biaxial stretching method. Separator 15 may also be formed by joining a PP film and a PE film.

In addition, the following is the reason why introduction of foreign substance 31 is more likely to occur on the outer peripheral side of electrode body 11. Positive electrode lead 23 is connected to the outermost peripheral portion of positive electrode exposing portion 13D in electrode body 11. Usually, positive electrode lead 23 is significantly thicker than positive electrode collector 13A that forms positive electrode exposing portion 13D, and therefore, heavier than positive electrode collector 13A. Accordingly, the outermost peripheral portion of positive electrode 13 in electrode body 11 is inclined toward the inner peripheral side of electrode body 11 due to the weight of positive electrode lead 23. This leads to an increase in the distance between the outermost peripheral portion of positive electrode 13 and outer peripheral portion 15p of separator 15 in electrode body 11, so that foreign substance 31 introduced into a case main body 1A tends to be readily introduced between the outermost peripheral portion of positive electrode 13 and outer peripheral portion 15p of separator 15 in electrode body 11.

Furthermore, not in outer peripheral portion 15p of separator 15 but in a part of the residual portion of separator 15, the amount of change in the thickness of separator 15 at the time of restraint at 10 MPa may be 50% or more. However, introduction of foreign substance 31 is more likely to occur on the outer peripheral side of electrode body 11. Accordingly, the effect described in the above first embodiment can be more readily achieved in the case where the amount of change in the thickness of separator 15 at the time of restraint at 10 MPa is 50% or more in the outer peripheral portion of separator 15.

Third Embodiment

Figure 6:
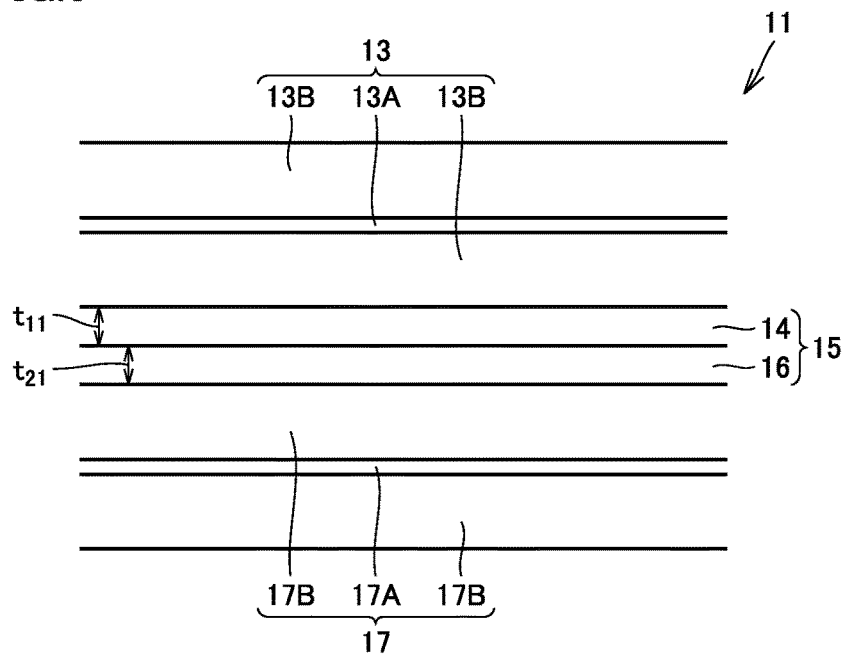
FIG. 6 is a cross-sectional view of a main part of the electrode body in one embodiment of the present invention.
Figure 7:
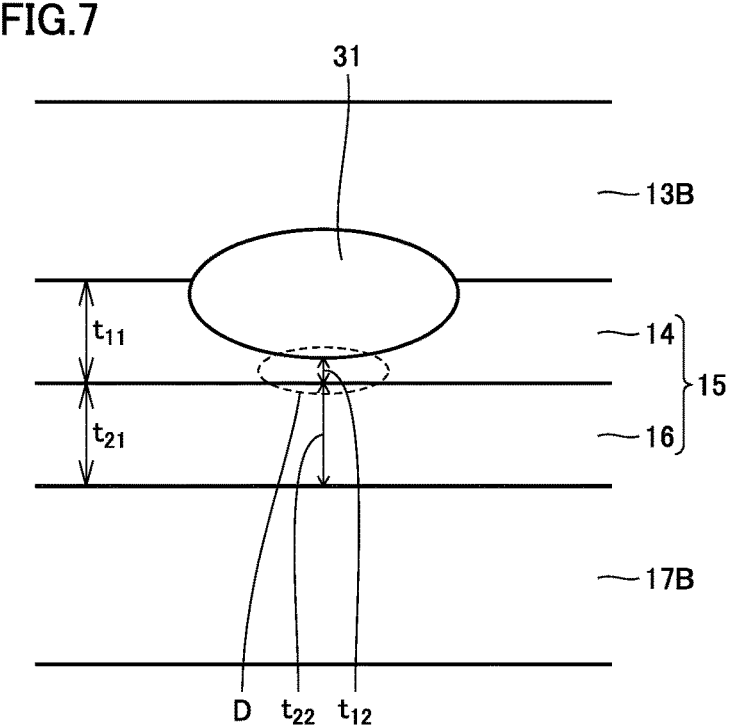
FIG. 7 is a schematic side view of the separator at the time when a foreign substance is introduced into the electrode body.
Figure 8:
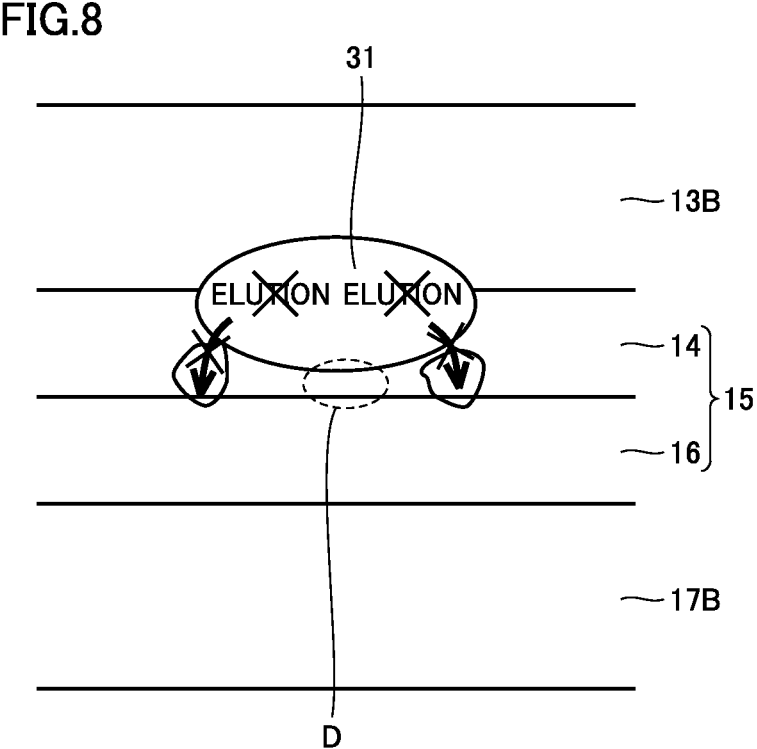
FIG. 8 is a schematic side view of the separator at the time when a foreign substance is introduced into the electrode body.

In the third embodiment of the present invention, the separator includes the first separator and the second separator. FIG. 6 is a cross-sectional view of a main part of the electrode body in the present embodiment. FIGS. 7 and 8 each are a schematic side view of the separator at the time when a foreign substance is introduced into the electrode body. In the following, the features different from those in the above first embodiment will be mainly described.

In the present embodiment, separator 15 has a first separator 14 facing positive electrode 13 and a second separator 16 facing negative electrode 17 and being in contact with first separator 14.

The amount of change in the thickness of first separator 14 at the time of restraint at 10 MPa is 50% or more. On the other hand, the amount of change in the thickness of second separator 16 at the time of restraint at 10 MPa may be 50% or more, but is preferably less than 50%.

It is considered that a chemical minute short circuit is more likely to occur when foreign substance 31 is introduced between positive electrode 13 and separator 15. When foreign substance 31 is introduced between positive electrode 13 and separator 15, the contact pressure caused by this foreign substance 31 tends to be readily absorbed by first separator 14 that faces positive electrode 13. In the present embodiment, since the amount of change in the thickness of first separator 14 at the time of restraint at 10 MPa is 50% or more (FIG. 7), elution of foreign substance 31 introduced between positive electrode 13 and separator 15 can be effectively prevented (FIG. 8). Therefore, the effect described in the above first embodiment can be achieved.

Furthermore, since the amount of change in the thickness of second separator 16 at the time of restraint at 10 MPa can be set to be less than 50%, deterioration in the electrolyte retention capability of second separator 16 can be prevented, so that deterioration in the electrolyte retention capability of the entire separator 15 can be prevented. Therefore, deterioration in performance of the nonaqueous electrolyte secondary battery can be further prevented, and for example, the I-V resistance of the nonaqueous electrolyte secondary battery can be kept lower.

More preferably, the amount of change in the thickness of second separator 16 at the time of restraint at 10 MPa is 5% or less. Thereby, deterioration in the electrolyte retention capability of second separator 16 can be further prevented, so that deterioration in the electrolyte retention capability of the entire separator 15 can be further prevented. Therefore, deterioration in performance of the nonaqueous electrolyte secondary battery can be still further prevented, and for example, the I-V resistance of the nonaqueous electrolyte secondary battery can be kept still lower.

The "amount of change in the thickness of first separator 14" is expressed by the following equation 3. In the following equation 3, a thickness $t_{11}$ indicates the thickness of first separator 14 before restraint at 10 MPa (FIG. 6) while a thickness $t_{12}$ indicates the thickness of first separator 14 at the time of restraint at 10 MPa (FIG. 7). Thickness $t_{11}$ and thickness $t_{12}$ can be measured, for example, using a film thickness meter. It is preferable that thickness $t_{11}$ is 1 μm or more and 15 μm or less, but not limited thereto.

(Amount of change in thickness of first separator 14)(%)=(thickness $t_{11}$−thickness $t_{12}$)÷thickness $t_{11}$×100     Equation 3.

The "amount of change in the thickness of second separator 16" is expressed by the following equation 4. In the following equation 4, a thickness $t_{21}$ indicates the thickness of second separator 16 before restraint at 10 MPa (FIG. 6) while a thickness $t_{22}$ indicates the thickness of second separator 16 at the time of restraint at 10 MPa (FIG. 7). Thickness $t_{21}$ and thickness $t_{22}$ can be measured, for example, using a film thickness meter. It is preferable that thickness $t_{21}$ is 1 μm or more and 15 μm or less, but not limited thereto.

(Amount of change in thickness of second separator 16)(%)=(thickness $t_{21}$−thickness $t_{22}$)÷thickness $t_{21}$×100     Equation 4.

The method of forming first separator 14 is not particularly limited. For example, the method of setting the amount of change in the thickness of separator 15 at the time of restraint at 10 MPa to be 50% or more (described in the above first embodiment) can be used.

The method of forming second separator 16 is not particularly limited. For example, the method of forming a residual portion of separator 15 (described in the above second embodiment) can be used. It is to be noted that second separator 16 may be formed by stacking two or more layers.

Fourth Embodiment

Figure 9:
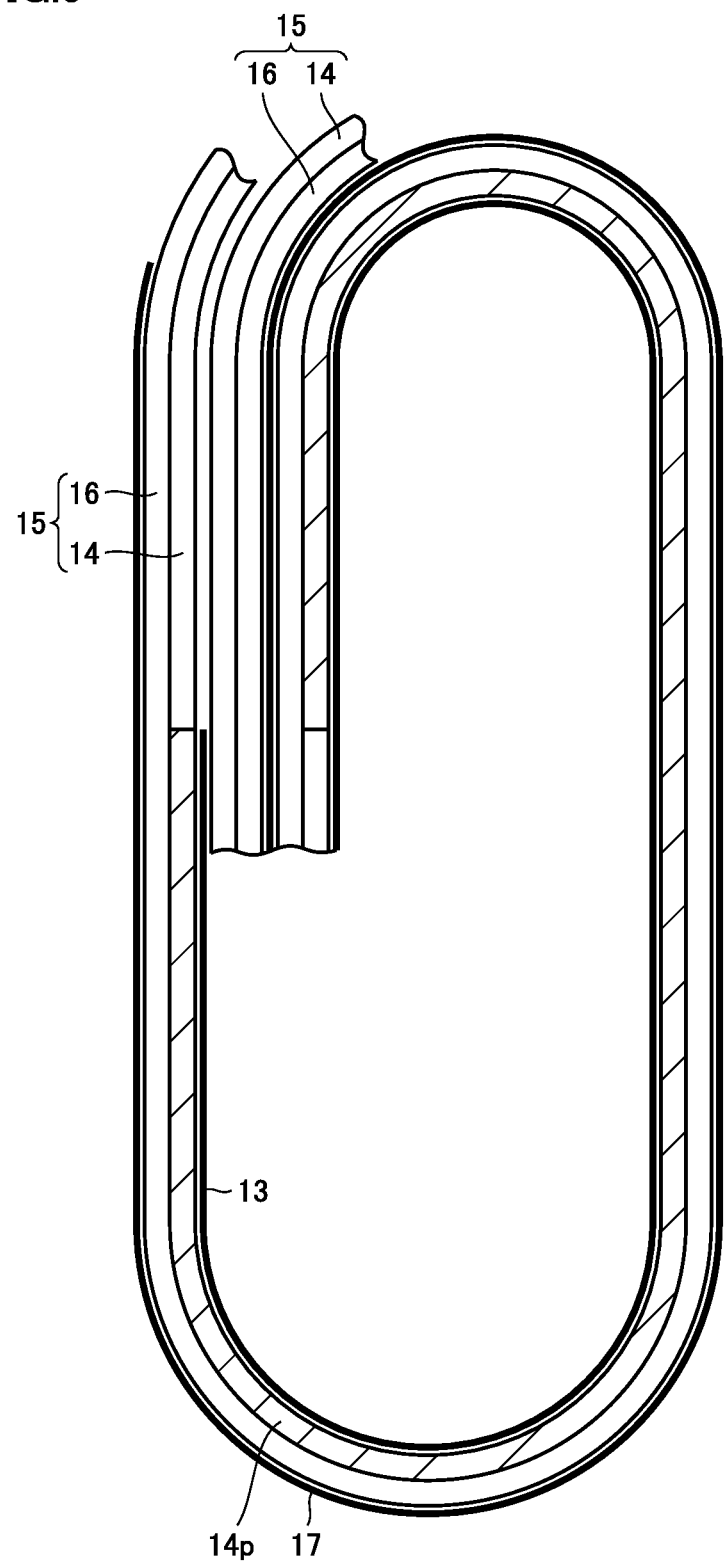
FIG. 9 is a cross-sectional view of a main part of the electrode body in one embodiment of the present invention.

The fourth embodiment of the present invention is obtained by applying the above-described second embodiment to the above-described third embodiment. FIG. 9 is a cross-sectional view of a main part of an electrode body in the fourth embodiment of the present invention. In FIG. 9, in order to show the feature of first separator 14 in the present embodiment, first separator 14 and second separator 16 are shown thicker than positive electrode 13 and negative electrode 17. In the following, the features different from those in the above third embodiment will be mainly described.

In the present embodiment, the amount of change in the thickness of an outer peripheral portion 14p of first separator 14 (a diagonally shaded region in FIG. 9) at the time of restraint at 10 MPa is 50% or more, whereas the amount of change in the thickness of the residual portion of first separator 14 (a portion of first separator 14 excluding outer peripheral portion 14p of first separator 14) at the time of restraint at 10 MPa is less than 50%. Since introduction of foreign substance 31 is more likely to occur on the outer peripheral side of electrode body 11, occurrence of an internal short circuit resulting from introduction of a foreign substance can be effectively prevented, with the result that the effect described in the above first embodiment can be achieved.

Furthermore, since the amount of change in the thickness of the residual portion of first separator 14 at the time of restraint at 10 MPa can be set to be less than 50%, deterioration in the electrolyte retention capability of the entire first separator 14 can be prevented. Therefore, since deterioration in the electrolyte retention capability of the entire separator 15 can be prevented, deterioration in performance of the nonaqueous electrolyte secondary battery can be further prevented. For example, the I-V resistance of the nonaqueous electrolyte secondary battery can be kept lower.

More preferably, the amount of change in the thickness of the residual portion of first separator 14 at the time of restraint at 10 MPa is 5% or less. Thereby, deterioration in the electrolyte retention capability of the entire first separator 14 can be further prevented, so that deterioration in the electrolyte retention capability of the entire separator 15 can be further prevented. Therefore, deterioration in performance of the nonaqueous electrolyte secondary battery can be further prevented, and for example, the I-V resistance of the nonaqueous electrolyte secondary battery can be kept still lower.

The method of forming outer peripheral portion 14p of first separator 14 is not particularly limited. For example, the method of setting the amount of change in the thickness of separator 15 at the time of restraint at 10 MPa to be 50% or more (described in the above first embodiment) can be used.

The method of forming the residual portion of first separator 14 is not particularly limited. For example, the method of forming the residual portion of separator 15 (described in the above second embodiment) can be used.

The method of forming first separator 14 is not particularly limited. For example, the method of forming separator 15 (described in the above second embodiment) can be used.

EXAMPLES

Although the present invention will be hereinafter described in greater detail, the present invention is not limited thereto.

Example 1

(Production of Positive Electrode)

Powder made of a lithium composite oxide containing Li and three types of transition metal elements (Co, Ni, and Mn) was prepared as a positive electrode active material. The positive electrode active material, acetylene black (a conducting agent), and sodium salt (a thickening agent) of CMC (carboxymethylcellulose) were mixed into water to obtain a positive electrode mixture paste.

The positive electrode mixture paste was applied to both surfaces of an aluminum (Al) foil (a positive electrode collector having a thickness of 15 µm) and then dried so as to expose one end of the Al foil in the width direction. Thereby, a positive electrode mixture layer was formed on both surfaces of the Al foil. Then, the positive electrode mixture layer and the Al foil were rolled using a roll rolling machine. In this way, a positive electrode having a positive electrode exposing portion was obtained.

(Production of Negative Electrode)

Scaly graphite was prepared as a negative electrode active material. The negative electrode active material, SBR (Styrene-butadiene rubber) (a binding agent) and sodium salt (a thickening agent) of CMC were mixed to obtain a negative electrode mixture paste.

The negative electrode mixture paste was applied to both surfaces of a copper (Cu) foil (a negative electrode collector having a thickness of 10 µm) and then dried so as to expose one end of the Cu foil in the width direction. Thereby, a negative electrode mixture layer was formed on both surfaces of the Cu foil. Then, the negative electrode mixture layer and the Cu foil were rolled using the roll rolling machine. In this way, a negative electrode having a negative electrode exposing portion was obtained.

(Production of Separator)

The first separator (having a thickness of 5 µm) made of PP was formed by the biaxial stretching method. When a film thickness meter was used to measure the amount of change in the thickness of the first separator at the time of restraint at 10 MPa, the amount of change was 50%. When the porosity of the first separator was calculated, the porosity was 40%.

A PE layer (having a thickness of 5 µm) and a PP layer (having a thickness of 5 µm) were formed by the uniaxial stretching method. When a film thickness meter was used to measure the amount of change in the thickness of each of the PE layer and the PP layer at the time of restraint at 10 MPa, each amount of change was 5%. When the porosity of each of the PE layer and the PP layer was calculated, each porosity was 20%. Then, the first separator, the PE layer, and the PP layer were sequentially stacked to thereby obtain a separator.

(Production and Insertion of Electrode Body)

The separator was arranged between the positive electrode mixture layer and the negative electrode mixture layer such that the first separator faced the positive electrode mixture layer while the PP layer faced the negative electrode mixture layer. Furthermore, the positive electrode, the negative electrode, and the separator were arranged such that the positive electrode exposing portion and the negative electrode exposing portion protruded from the separator in opposite directions in the width direction of the Al foil (or the Cu foil).

Then, a winding shaft (not shown) was arranged so as to extend parallel to the width direction of the Al foil (or the Cu foil), and the positive electrode, the separator and the negative electrode were wound using this winding shaft. Then, a pressure of 4 kN/cm$^2$ was applied to the obtained cylindrical electrode body for 2 minutes at room temperature, thereby obtaining a flat-shaped electrode body.

Then, a foreign substance (made of copper and having a diameter of 100 µm) was introduced between the positive electrode and the separator in the electrode body. Then, the positive electrode exposing portion of the electrode body and the positive electrode terminal were connected using a positive electrode lead, and the negative electrode exposing portion of the electrode body and the negative electrode terminal were connected using a negative electrode lead. Then, the electrode body was placed in a battery case made of a laminate film.

(Preparation and Introduction of Nonaqueous Electrolytic Solution)

Ethylene carbonate, diethyl carbonate, and ethyl methyl carbonate were mixed together so as to attain a volume ratio of 30:40:30, thereby achieving a mixed solvent. Into this mixed solvent, $LiPF_6$ was introduced to attain a concentration of 1.0 mol/L. In this way, an electrolyte solution was obtained. After the obtained electrolyte solution was introduced into the laminate film, this laminate film was sealed. In this way, a nonaqueous electrolyte secondary battery in Example 1 was obtained.

Examples 2 to 16 and Comparative Example 1

In Examples 2 to 11 and Comparative Example 1, a nonaqueous electrolyte secondary battery was produced in accordance with the method described in the above Example 1, except that the amount of change in the thickness of the first separator at the time of restraint at 10 MPa attained each of values shown in Table 1.

In Examples 12 to 16, a nonaqueous electrolyte secondary battery was produced in accordance with the method described in the above Example 1, except that the amount of change in the thickness of each of the first separator, the PE layer and the PP layer at the time of restraint at 10 MPa attained each of values shown in Table 2.

(Occurrence and Nonoccurrence of Internal Short Circuit)

After the battery voltage of the nonaqueous electrolyte secondary battery was held at 4.1V for 5 hours, this nonaqueous electrolyte secondary battery was left in a constant temperature bath (25° C.), in which state the battery voltage was measured for one day. In this battery voltage measurement, a digital multimeter (manufactured by ADVANTEST Corporation) was used to measure an open-circuit voltage of the nonaqueous electrolyte secondary battery.

The results are shown in "Occurrence and Nonoccurrence of Internal Short Circuit" in each of Tables 1 and 2. In Tables 1 and 2, "A" indicates that the amount of change in battery voltage during battery voltage measurement was less than 5 mV, that is, indicates that it was determined that an internal short circuit did not occur in the nonaqueous electrolyte secondary battery. "B" indicates that the amount of change in battery voltage during battery voltage measurement was 5 mV or higher, that is, indicates that it was determined that an internal short circuit occurred in the nonaqueous electrolyte secondary battery.

(Measurement of I-V Resistance)

Then, a current of 10 C was caused to flow so as to attain a battery voltage of 3.7V under an environment of 0° C. to charge the nonaqueous electrolyte secondary battery. Then, a voltage change amount ($\Delta V$) was obtained, and the obtained $\Delta V$ was divided by the current, thereby finding an I-V resistance. The results are shown in "I-V resistance" in each of Tables 1 and 2.

TABLE 1

| | First Separator (positive electrode side) | | PE Layer (middle) | | PP Layer (negative electrode side) | | Occurrence and Non-occurrence of Internal Short Circuit | I-V Resistance (mΩ) |
|---|---|---|---|---|---|---|---|---|
| | Amount of Change in Thickness (%)*1 | Porosity (%) | Amount of Change in Thickness (%)*2 | Porosity (%) | Amount of Change in Thickness (%)*3 | Porosity (%) | | |
| Comparative Example 1 | 45 | 35 | 5 | 20 | 5 | 20 | B | 2 |
| Example 1 | 50 | 40 | 5 | 20 | 5 | 20 | A | 2 |
| Example 2 | 55 | 45 | | | | | | 2 |
| Example 3 | 60 | 50 | | | | | | 2 |
| Example 4 | 65 | 55 | | | | | | 2.2 |
| Example 5 | 70 | 60 | | | | | | 2.4 |
| Example 6 | 75 | 65 | | | | | | 2.5 |
| Example 7 | 80 | 70 | | | | | | 2.7 |
| Example 8 | 85 | 75 | | | | | | 5 |
| Example 9 | 90 | 80 | | | | | | 10 |
| Example 10 | 95 | 85 | | | | | | 20 |
| Example 11 | 100 | 90 | | | | | | 20 |

"Amount of Change in Thickness (%)*1" means the amount of change (%) in the thickness of the first separator at the time of restraint at 10 MPa.
"Amount of Change in Thickness (%)*2" means the amount of change (%) in the thickness of the PE layer at the time of restraint at 10 MPa.
"Amount of Change in Thickness (%)*3" means the amount of change (%) in the thickness of the PP layer at the time of restraint at 10 MPa.

TABLE 2

| | First Separator (positive electrode side) | | PE Layer (middle) | | PP Layer (negative electrode side) | | Occurrence and Non-occurrence of Internal Short Circuit | I-V Resistance (mΩ) |
|---|---|---|---|---|---|---|---|---|
| | Amount of Change in Thickness (%)*1 | Porosity (%) | Amount of Change in Thickness (%)*2 | Porosity (%) | Amount of Change in Thickness (%)*3 | Porosity (%) | | |
| Example 1 | 50 | 40 | 5 | 20 | 5 | 20 | A | 2 |
| Example 12 | | | 50 | 40 | 50 | 40 | | 10 |
| Example 2 | 55 | 45 | 5 | 20 | 5 | 20 | A | 2 |

TABLE 2-continued

| | First Separator (positive electrode side) | | PE Layer (middle) | | PP Layer (negative electrode side) | | Occurrence and Non-occurrence of Internal Short Circuit | I-V Resistance (mΩ) |
|---|---|---|---|---|---|---|---|---|
| | Amount of Change in Thickness (%)*1 | Porosity (%) | Amount of Change in Thickness (%)*2 | Porosity (%) | Amount of Change in Thickness (%)*3 | Porosity (%) | | |
| Example 13 | | | 50 | 40 | 50 | 40 | | 10 |
| Example 3 | 60 | 50 | 5 | 20 | 5 | 20 | A | 2 |
| Example 14 | | | 50 | 40 | 50 | 40 | | 13 |
| Example 4 | 65 | 55 | 5 | 20 | 5 | 20 | A | 2.2 |
| Example 15 | | | 50 | 40 | 50 | 40 | | 20 |
| Example 5 | 70 | 60 | 5 | 20 | 5 | 20 | A | 2.4 |
| Example 16 | | | 50 | 40 | 50 | 40 | | 20 |

"Amount of Change in Thickness (%)*1" means the amount of change (%) in the thickness of the first separator at the time of restraint at 10 MPa.
"Amount of Change in Thickness (%)*2" means the amount of change (%) in the thickness of the PE layer at the time of restraint at 10 MPa.
"Amount of Change in Thickness (%)*3" means the amount of change (%) in the thickness of the PP layer at the time of restraint at 10 MPa.

(Review)

As shown in Tables 1 and 2, in Examples 1 to 16, occurrence of an internal short circuit could be prevented even though a foreign substance was introduced between the positive electrode and the separator. On the other hand, occurrence of an internal short circuit could not be prevented in Comparative Example 1. Based on this result, it turned out that occurrence of an internal short circuit resulting from introduction of a foreign substance into the electrode body can be prevented if the amount of change in the thickness of the first separator at the time of restraint at 10 MPa is 50% or more.

The I-V resistance was lower in Examples 1 to 9 than in Examples 10 and 11. Based on this result, it turned out that deterioration in performance of the nonaqueous electrolyte secondary battery can be prevented if the amount of change in the thickness of the first separator at the time of restraint at 10 MPa is 50% or more and 90% or less.

The I-V resistance in each of Examples 1 to 8 was 5 mΩ or lower, which was further lower than the I-V resistance in Example 9. Based on this result, it turned out that deterioration in performance of the nonaqueous electrolyte secondary battery can be further prevented if the amount of change in the thickness of the first separator at the time of restraint at 10 MPa is 50% or more and 85% or less.

The I-V resistance was lower in Example 1 than in Example 12. The same relation also applies to Example 2 and Example 13; Example 3 and Example 14; Example 4 and Example 15; and Example 5 and Example 16. Based on these results, it turned out that deterioration in performance of the nonaqueous electrolyte secondary battery can be further prevented if the amount of change in the thickness of each of the PE layer and the PP layer at the time of restraint at 10 MPa is 5% or less.

Although the present invention has been described and illustrated in detail, it is clearly understood that the same is by way of illustration and example only and is not to be taken by way of limitation, the scope of the present invention being interpreted by the terms of the appended claims.

For example, it is preferable that the nonaqueous electrolyte secondary battery is a lithium ion secondary battery. It is preferable that the positive electrode and the negative electrode have commonly-used configurations of a positive electrode and a negative electrode, respectively, of a lithium ion secondary battery. The materials of the positive electrode collector and the positive electrode mixture layer that form a positive electrode are not limited to the materials described in the above Examples. It is preferable that the contents of the positive electrode active material, the conducting agent and the binding agent in the positive electrode mixture layer are commonly-used contents as those of the positive electrode active material, the conducting agent, and the binding agent, respectively, in the positive electrode mixture layer of the lithium ion secondary battery. The material of the positive electrode lead is not particularly limited. The same also applies to the negative electrode.

The materials of the solvent and the dissolved substance of the nonaqueous electrolyte are not limited to the materials described in the above Examples. A gel solvent may be used as a solvent.

The electrode body may be formed by winding a positive electrode and a negative electrode with a separator sandwiched therebetween (as a cylindrically-shaped electrode body), or may be formed by sequentially stacking a positive electrode, a separator, a negative electrode, and a separator (as a stack type electrode body).

What is claimed is:

1. A nonaqueous electrolyte secondary battery comprising an electrode body that has a positive electrode, a negative electrode, and a separator provided between said positive electrode and said negative electrode, a nonaqueous electrolyte being held at least in said separator, wherein said separator includes at least polypropylene, said separator has a thickness $t_1$ before restraint and a thickness $t_2$ at a restraint at 10 MPa, and said separator satisfies the following Equation 1:

(thickness $t_1$−thickness $t_2$)÷thickness $t_1$×100=50% or more and 90% or less.

2. The nonaqueous electrolyte secondary battery according to claim 1, wherein said electrode body is configured by winding said positive electrode and said negative electrode with said separator sandwiched therebetween, an outer peripheral portion of said separator satisfies Equation 1.

3. The nonaqueous electrolyte secondary battery according to claim 2, wherein said separator has a first layer facing said positive electrode, said first layer has a thickness a thickness $t_{11}$ before restraint and a thickness $t_{12}$ at a restraint at 10 MPa, and said separator said first layer satisfies the following:

(thickness $t_{11}$−thickness $t_{12}$)÷thickness $t_{11}$×100 is equal to (thickness $t_1$−thickness $t_2$)÷thickness $t_1$×100.

4. The nonaqueous electrolyte secondary battery according to claim 3, wherein said separator has a second layer facing said negative electrode, said second layer has a thickness a thickness $t_{21}$ before restraint and a thickness $t_{22}$ at a restraint at 10 MPa, and said second layer satisfies the following Equation 4:

(thickness $t_{21}$−thickness $t_{22}$)÷thickness $t_{21}$×100=5% or less.

5. The nonaqueous electrolyte secondary battery according to claim 1, wherein said separator has a first layer facing said positive electrode, said first layer has a thickness a thickness $t_{11}$ before restraint and a thickness $t_{12}$ at a restraint at 10 MPa, and said separator said first layer satisfies the following:

(thickness $t_{11}$−thickness $t_{12}$)÷thickness $t_{11}$×100 is equal to (thickness $t_1$−thickness $t_2$)÷thickness $t_1$×100.

6. The nonaqueous electrolyte secondary battery according to claim 5, wherein said separator has a second layer facing said negative electrode, said second layer has a thickness a thickness $t_{21}$ before restraint and a thickness $t_{22}$ at a restraint at 10 MPa, and said second layer satisfies the following Equation 4:

(thickness $t_{21}$−thickness $t_{22}$)÷thickness $t_{21}$×100=5% or less.

* * * * *